(12) United States Patent
Kawamura et al.

(10) Patent No.: US 10,156,876 B2
(45) Date of Patent: Dec. 18, 2018

(54) ELECTRONIC APPARATUS AND COOLING METHOD THEREOF

(71) Applicant: FUJITSU LIMITED, Kawasaki-shi, Kanagawa (JP)

(72) Inventors: Koki Kawamura, Kawasaki (JP); Koichi Hiramoto, Setagaya (JP); Yosuke Kubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/089,000

(22) Filed: Apr. 1, 2016

(65) Prior Publication Data
US 2016/0306400 A1    Oct. 20, 2016

(30) Foreign Application Priority Data

Apr. 20, 2015  (JP) ................. 2015-086026

(51) Int. Cl.
*G06F 1/20*  (2006.01)
*G06F 1/32*  (2006.01)

(52) U.S. Cl.
CPC ............. *G06F 1/206* (2013.01); *G06F 1/20* (2013.01); *G06F 1/329* (2013.01)

(58) Field of Classification Search
None
See application file for complete search history.

(56) References Cited

U.S. PATENT DOCUMENTS

2006/0248360 A1* 11/2006 Fung ................. G06F 1/206
                                                      713/300
2008/0232974 A1   9/2008 Tsuchiya
2008/0310099 A1* 12/2008 Monferrer .......... H01L 23/34
                                                      361/679.46
2011/0231860 A1   9/2011 Kazama et al.
2013/0111492 A1*  5/2013 Nojiri ................. G06F 1/206
                                                      718/104
2013/0258582 A1* 10/2013 Shelnutt .............. G06F 1/206
                                                      361/679.48

(Continued)

FOREIGN PATENT DOCUMENTS

| JP | 2004-186183 A | 7/2004 |
| JP | 2014-191677 A | 10/2004 |
| JP | 2005-141669 A | 6/2005 |

(Continued)

OTHER PUBLICATIONS

Japanese Office Action of related Japanese Patent Application No. 2015-086026 dated Sep. 11, 2018.

*Primary Examiner* — Dennis M Butler
(74) *Attorney, Agent, or Firm* — Arent Fox LLP

(57) ABSTRACT

An electronic apparatus includes a processor. The processor is configured to acquire respective temperatures of a plurality of module devices. The processor is configured to increase a cooling level of a first cooling device when a temperature of a first module device of the plurality of module devices exceeds a first threshold value. The first cooling device cools the first module device. The processor is configured to expel, on basis of the respective temperatures, part of processing performed by the first module device to a second module device of the plurality of module devices. The second module device is of a same type as the first module device.

8 Claims, 15 Drawing Sheets

(56) References Cited

U.S. PATENT DOCUMENTS

2014/0355203 A1  12/2014  Kondo

FOREIGN PATENT DOCUMENTS

| JP | 2008-216382 A | 9/2008 |
| JP | 2008-235696 A | 10/2008 |
| JP | 2009-027051 A | 2/2009 |
| JP | 2010-165265 A | 7/2010 |
| JP | 2011-141672 A | 7/2011 |
| JP | 2011-197715 A | 10/2011 |
| JP | 2012-005038 A | 1/2012 |
| JP | 2014-234938 A | 12/2014 |

* cited by examiner

FIG.3A

| SLOT NUMBER | GROUP ID | CARD TYPE | TEMPERATURE MEASUREMENT VALUE | HIGH TEMPERATURE THRESHOLD | LOW TEMPERATURE THRESHOLD | TEMPERATURE STATE FLAG |
|---|---|---|---|---|---|---|
| 1 | 1 | L1 | MEASUREMENT VALUE (1) | HIGH TEMPERATURE THRESHOLD (1) | LOW TEMPERATURE THRESHOLD (1) | TEMPERATURE STATE FLAG (1) |
| 2 | 1 | L2-1 | MEASUREMENT VALUE (2) | HIGH TEMPERATURE THRESHOLD (2) | LOW TEMPERATURE THRESHOLD (2) | TEMPERATURE STATE FLAG (2) |
| 3 | 1 | L2-2 | MEASUREMENT VALUE (3) | HIGH TEMPERATURE THRESHOLD (3) | LOW TEMPERATURE THRESHOLD (3) | TEMPERATURE STATE FLAG (3) |
| 4 | 1 | L3 | MEASUREMENT VALUE (4) | HIGH TEMPERATURE THRESHOLD (4) | LOW TEMPERATURE THRESHOLD (4) | TEMPERATURE STATE FLAG (4) |
| 5 | 2 | L1 | MEASUREMENT VALUE (5) | HIGH TEMPERATURE THRESHOLD (5) | LOW TEMPERATURE THRESHOLD (5) | TEMPERATURE STATE FLAG (5) |
| 6 | 2 | L2-1 | MEASUREMENT VALUE (6) | HIGH TEMPERATURE THRESHOLD (6) | LOW TEMPERATURE THRESHOLD (6) | TEMPERATURE STATE FLAG (6) |
| 7 | 2 | L2-2 | MEASUREMENT VALUE (7) | HIGH TEMPERATURE THRESHOLD (7) | LOW TEMPERATURE THRESHOLD (7) | TEMPERATURE STATE FLAG (7) |
| 8 | 2 | L3 | MEASUREMENT VALUE (8) | HIGH TEMPERATURE THRESHOLD (8) | LOW TEMPERATURE THRESHOLD (8) | TEMPERATURE STATE FLAG (8) |

| SLOT NUMBER | GROUP ID | CARD TYPE | TEMPERATURE MEASUREMENT VALUE | HIGH TEMPERATURE THRESHOLD | LOW TEMPERATURE THRESHOLD | TEMPERATURE STATE FLAG |
|---|---|---|---|---|---|---|
| 9 | 3 | L1 | MEASUREMENT VALUE (9) | HIGH TEMPERATURE THRESHOLD | LOW TEMPERATURE THRESHOLD | TEMPERATURE STATE FLAG |
| 10 | 3 | L2-1 | MEASUREMENT VALUE (10) | HIGH TEMPERATURE THRESHOLD (9) | LOW TEMPERATURE THRESHOLD (9) | TEMPERATURE STATE FLAG (9) |
| 11 | 3 | L2-2 | MEASUREMENT VALUE (11) | HIGH TEMPERATURE THRESHOLD (10) | LOW TEMPERATURE THRESHOLD (10) | TEMPERATURE STATE FLAG (10) |
| 12 | 3 | L3 | MEASUREMENT VALUE (12) | HIGH TEMPERATURE THRESHOLD (11) | LOW TEMPERATURE THRESHOLD (11) | TEMPERATURE STATE FLAG (11) |
| 13 | 4 | L1 | MEASUREMENT VALUE (13) | HIGH TEMPERATURE THRESHOLD (12) | LOW TEMPERATURE THRESHOLD (12) | TEMPERATURE STATE FLAG (12) |
| 14 | 4 | L2-1 | MEASUREMENT VALUE (14) | HIGH TEMPERATURE THRESHOLD (13) | LOW TEMPERATURE THRESHOLD (13) | TEMPERATURE STATE FLAG (13) |
| 15 | 4 | L2-2 | MEASUREMENT VALUE (15) | HIGH TEMPERATURE THRESHOLD (14) | LOW TEMPERATURE THRESHOLD (14) | TEMPERATURE STATE FLAG (14) |
| 16 | 4 | L3 | MEASUREMENT VALUE (16) | HIGH TEMPERATURE THRESHOLD (15) | LOW TEMPERATURE THRESHOLD (15) | TEMPERATURE STATE FLAG (15) |
|   |   |   |   | HIGH TEMPERATURE THRESHOLD (16) | LOW TEMPERATURE THRESHOLD (16) | TEMPERATURE STATE FLAG (16) |

FIG.4

| GROUP ID | COOLING LEVEL |
|---|---|
| 1 | HIGH |
| 2 | LOW |
| 3 | LOW |
| 4 | LOW |

| SLOT NUMBER | GROUP ID | CARD TYPE | TEMPERATURE MEASUREMENT VALUE | HIGH TEMPERATURE THRESHOLD | LOW TEMPERATURE THRESHOLD | TEMPERATURE STATE FLAG |
|---|---|---|---|---|---|---|
| 1 | 1 | L1 | MEASUREMENT VALUE (1) | HIGH TEMPERATURE THRESHOLD (1) | LOW TEMPERATURE THRESHOLD (1) | TEMPERATURE STATE FLAG (1) |
| 2 | 1 | L1 | MEASUREMENT VALUE (2) | HIGH TEMPERATURE THRESHOLD (2) | LOW TEMPERATURE THRESHOLD (2) | TEMPERATURE STATE FLAG (2) |
| 3 | 1 | L1 | MEASUREMENT VALUE (3) | HIGH TEMPERATURE THRESHOLD (3) | LOW TEMPERATURE THRESHOLD (3) | TEMPERATURE STATE FLAG (3) |
| 4 | 1 | L1 | MEASUREMENT VALUE (4) | HIGH TEMPERATURE THRESHOLD (4) | LOW TEMPERATURE THRESHOLD (4) | TEMPERATURE STATE FLAG (4) |
| 5 | 2 | L2-1 | MEASUREMENT VALUE (5) | HIGH TEMPERATURE THRESHOLD (5) | LOW TEMPERATURE THRESHOLD (5) | TEMPERATURE STATE FLAG (5) |
| 6 | 2 | L2-1 | MEASUREMENT VALUE (6) | HIGH TEMPERATURE THRESHOLD (6) | LOW TEMPERATURE THRESHOLD (6) | TEMPERATURE STATE FLAG (6) |
| 7 | 2 | L2-1 | MEASUREMENT VALUE (7) | HIGH TEMPERATURE THRESHOLD (7) | LOW TEMPERATURE THRESHOLD (7) | TEMPERATURE STATE FLAG (7) |
| 8 | 2 | L2-1 | MEASUREMENT VALUE (8) | HIGH TEMPERATURE THRESHOLD (8) | LOW TEMPERATURE THRESHOLD (8) | TEMPERATURE STATE FLAG (8) |

| SLOT NUMBER | GROUP ID | CARD TYPE | TEMPERATURE MEASUREMENT VALUE | HIGH TEMPERATURE THRESHOLD | LOW TEMPERATURE THRESHOLD | TEMPERATURE STATE FLAG |
|---|---|---|---|---|---|---|
| 9 | 3 | L2-2 | MEASUREMENT VALUE (9) | HIGH TEMPERATURE THRESHOLD (9) | LOW TEMPERATURE THRESHOLD (9) | TEMPERATURE STATE FLAG (9) |
| 10 | 3 | L2-2 | MEASUREMENT VALUE (10) | HIGH TEMPERATURE THRESHOLD (10) | LOW TEMPERATURE THRESHOLD (10) | TEMPERATURE STATE FLAG (10) |
| 11 | 3 | L2-2 | MEASUREMENT VALUE (11) | HIGH TEMPERATURE THRESHOLD (11) | LOW TEMPERATURE THRESHOLD (11) | TEMPERATURE STATE FLAG (11) |
| 12 | 3 | L2-2 | MEASUREMENT VALUE (12) | HIGH TEMPERATURE THRESHOLD (12) | LOW TEMPERATURE THRESHOLD (12) | TEMPERATURE STATE FLAG (12) |
| 13 | 4 | L3 | MEASUREMENT VALUE (13) | HIGH TEMPERATURE THRESHOLD (13) | LOW TEMPERATURE THRESHOLD (13) | TEMPERATURE STATE FLAG (13) |
| 14 | 4 | L3 | MEASUREMENT VALUE (14) | HIGH TEMPERATURE THRESHOLD (14) | LOW TEMPERATURE THRESHOLD (14) | TEMPERATURE STATE FLAG (14) |
| 15 | 4 | L3 | MEASUREMENT VALUE (15) | HIGH TEMPERATURE THRESHOLD (15) | LOW TEMPERATURE THRESHOLD (15) | TEMPERATURE STATE FLAG (15) |
| 16 | 4 | L3 | MEASUREMENT VALUE (16) | HIGH TEMPERATURE THRESHOLD (16) | LOW TEMPERATURE THRESHOLD (16) | TEMPERATURE STATE FLAG (16) |

FIG.11

| GROUP ID | COOLING LEVEL |
|---|---|
| 1 | LOW |
| 2 | HIGH |
| 3 | LOW |
| 4 | LOW |

17B

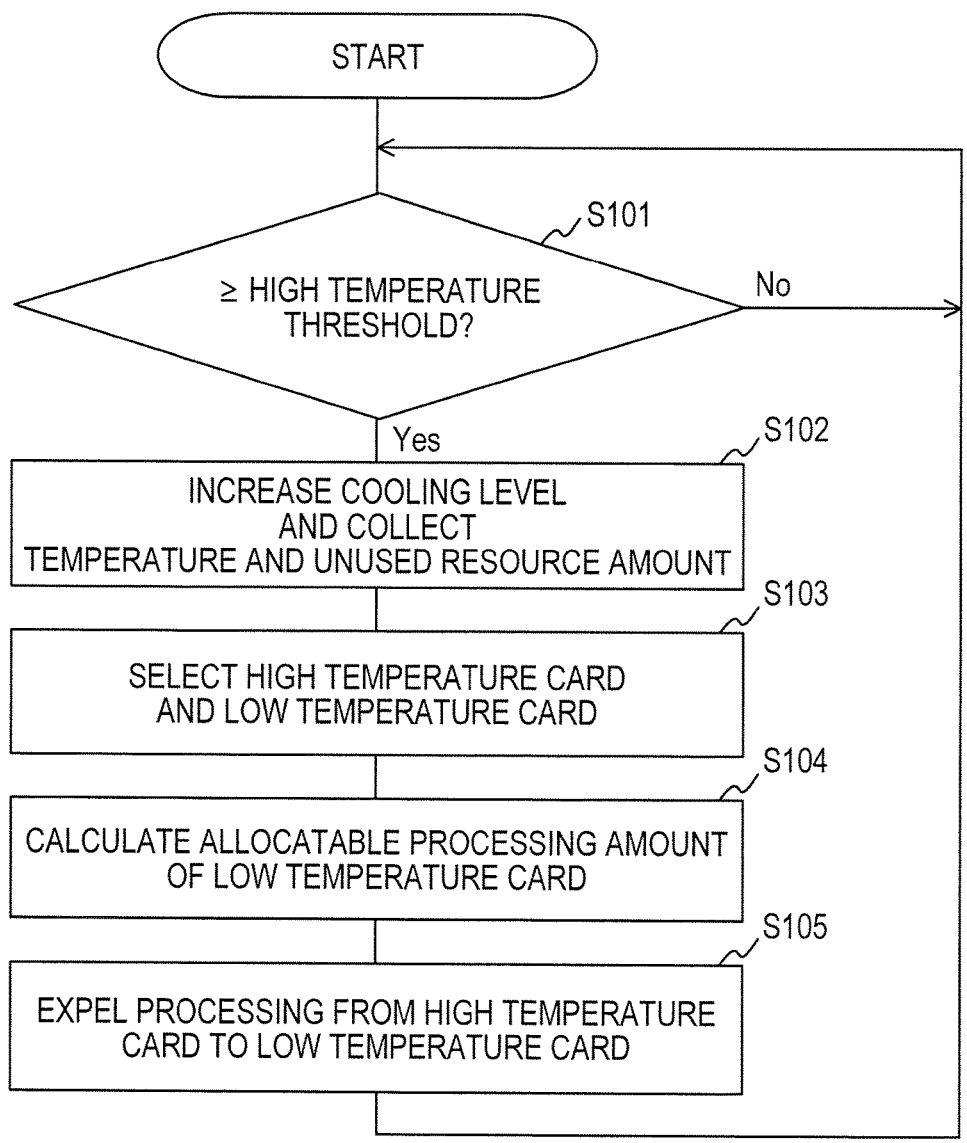

ELECTRONIC APPARATUS AND COOLING METHOD THEREOF

CROSS-REFERENCE TO RELATED APPLICATION

This application is based upon and claims the benefit of priority from the prior Japanese Patent Application No. 2015-086026, filed on Apr. 20, 2015, the entire contents of which are incorporated herein by reference.

FIELD

The embodiments discussed herein are related to an electronic apparatus and a cooling method thereof.

BACKGROUND

An electronic apparatus (also referred to as "electronic equipment") such as, for example, a base station apparatus (or a base station digital processing equipment (BDE)) includes a case that is provided with a plurality of slots, and a card type device equipped with a power source and an electronic circuit is mounted in each slot. Since the card type device mounted in the case becomes a heat generating source, the electronic circuit may abnormally operate due to the heat. In addition, there is also a problem in that power consumption increases due to an increase in operating temperature. Therefore, a cooling device such as, for example, a cooling fan is mounted in the electronic apparatus in order to cool the interior of the electronic apparatus.

As a countermeasure against a heat source of the electronic apparatus, there is a technology of controlling the number of revolutions of a fan unit on the basis of the temperature in the electronic apparatus. Further, there is also a technology, in which, when a new processing request is received, the apparatus temperatures of allocation destination candidates are considered in selecting an allocation destination for the relevant processing (job), such that a candidate having a lower temperature is selected as the allocation destination for the new processing request.

Related technologies are disclosed in, for example, Japanese Laid-Open Patent Publication No. 2004-186183, Japanese Laid-Open Patent Publication No. 2008-216382, Japanese Laid-open Patent Publication No. 2008-235696, Japanese Laid-Open Patent Publication No. 2009-027051, Japanese Laid-Open Patent Publication No. 2014-191677, Japanese Laid-Open Patent Publication No. 2005-141669, Japanese Laid-Open Patent Publication No. 2010-165265, Japanese Laid-Open Patent Publication No. 2011-197715, and Japanese Laid-Open Patent Publication No. 2012-005038.

However, the technology of controlling the number of revolutions of the fan unit on the basis of the temperature in an apparatus has the following problems. That is, in a situation where the processing load is concentrated on the apparatus, a state in which the calorific value of the apparatus is large is continuously maintained. Thus, even if the number of revolutions of the fan unit increases depending on the increase in temperature in the apparatus, there is a concern that the calorific value is not sufficiently reduced to the extent that the temperature decreases to a desired value.

Further, the technology of allocating a new job to an apparatus having a lower temperature does not consider the increase in temperature of the allocation destination apparatus after the allocation. Thus, as the processing load of the allocation destination apparatus increases after the allocation, the calorific value of the allocation destination apparatus may exceed the cooling capacity of the cooling device, and there is a concern that the temperature in the apparatus does not decrease to a proper level even if the number of revolutions of the fan unit increases.

SUMMARY

According to an aspect of the present invention, provided is an electronic apparatus including a processor. The processor is configured to acquire respective temperatures of a plurality of module devices. The processor is configured to increase a cooling level of a first cooling device when a temperature of a first module device of the plurality of module devices exceeds a first threshold value. The first cooling device cools the first module device. The processor is configured to expel, on basis of the respective temperatures, part of processing performed by the first module device to a second module device of the plurality of module devices. The second module device is of a same type as the first module device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 3A and 3B illustrate an exemplary data structure of a management table according to a first embodiment;

FIG. 4 illustrates an exemplary data structure of a cooling table according to a first embodiment;

FIGS. 10A and 10B illustrate contents registered in a management table according to a modified embodiment;

FIG. 11 illustrates contents registered in a cooling table according to a modified embodiment;

FIG. 13 is a flowchart illustrating exemplary processing of a control unit (CPU) according to a second embodiment.

DESCRIPTION OF EMBODIMENTS

Figure 1:
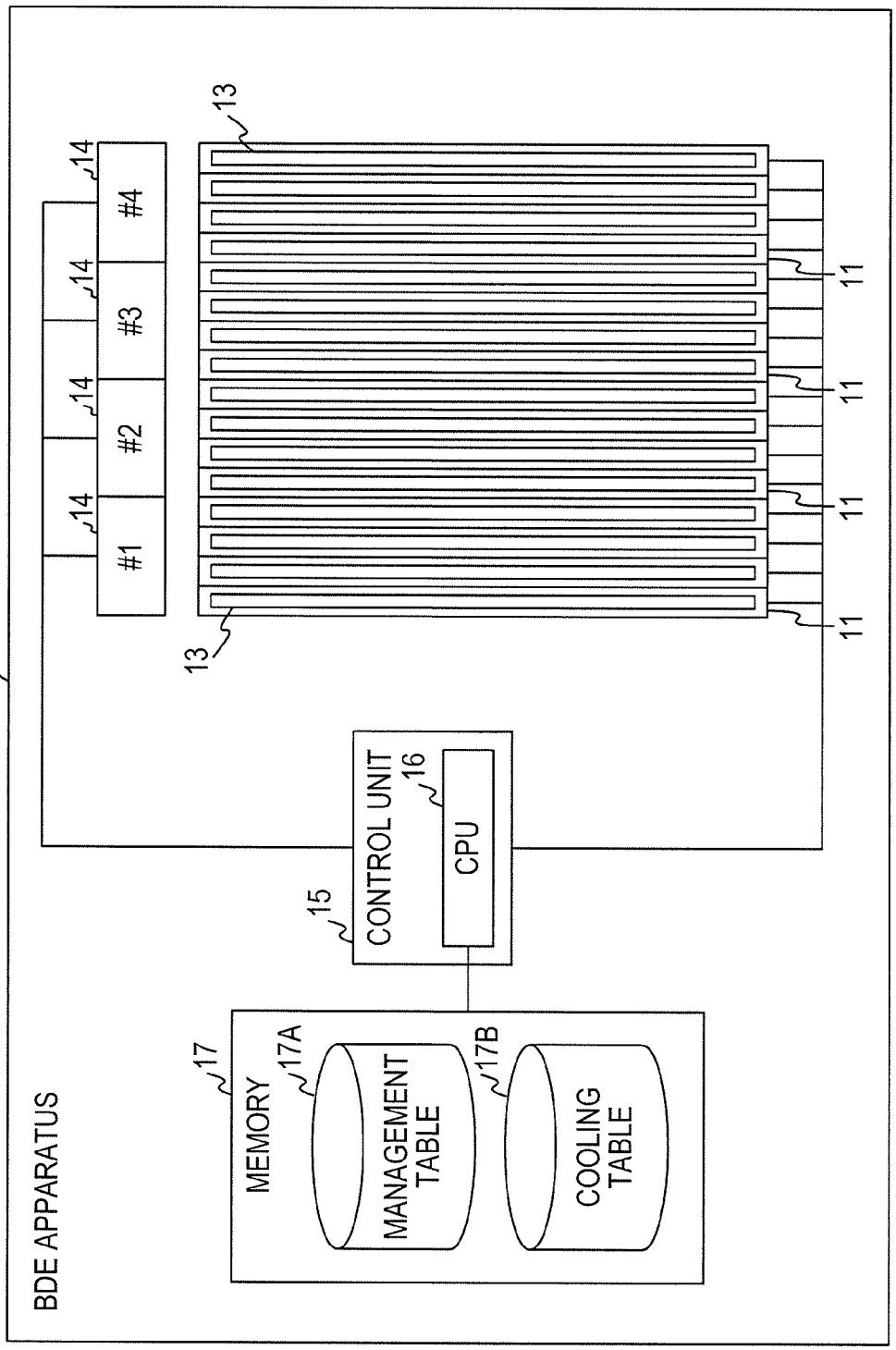
FIG. 1 illustrates an exemplary configuration of a BDE apparatus according to a first embodiment.

Hereinafter, embodiments of the present disclosure will be described with reference to the accompanying drawings. The configurations of the embodiments are for illustrative purposes and not limited thereto.

First Embodiment

An electronic apparatus (electronic equipment) according to the present disclosure is widely applicable to an apparatus that includes a plurality of accommodation sections each configured to accommodate a module device, one or more cooling devices configured to cool the module devices accommodated in the respective accommodation sections, and a control unit configured to control operations of the cooling devices and the respective module devices. In the first embodiment, descriptions will be made on a BDE apparatus (base station apparatus) that is applied to a Long Term Evolution (LTE) network, as an example of the electronic apparatus. The LTE network is an exemplary mobile communication network, and the BDE apparatus may support other radio communication standards such as, for example, a Wideband Code Division Multiple Access (W-CDMA) or an LTE-Advanced. The base station apparatus may also be called, for example, a radio base station (RBS), a base station (BS), or a Node-B.

The LTE network may include a core network and a radio network connected to the core network. The core network is connected with an external network such as, for example, the Internet or an intranet. The radio network is formed including a base station (eNB). A radio terminal (called, for example, user equipment (UE) or a mobile station (MS), hereinafter, referred to as a "terminal") is wirelessly connected with the base station. When a terminal is wirelessly connected with the base station, location registration for the terminal is performed in the core network. Further, a path (may also be called as a bearer) for sending user data (data transmitted/received by the terminal) from the terminal to the core network is set. The data transmitted from the terminal is sent from the core network to the external network through the path, and reaches a node of a communication counterpart. Further, data sent from the node of the communication counterpart reaches the terminal through the path.

The BDE apparatus refers to an apparatus that is equipped with a baseband unit that performs digital baseband processing, among a baseband unit and a radio unit (RF unit) that are provided in a base station. The BDE apparatus may be equipped with a network maintenance and supervisory function. The BDE apparatus is connected with a radio processing equipment (RE) apparatus equipped with the radio unit through, for example, a Common Public Radio Interface (CPRI). The RE apparatus may also be called, for example, remote radio equipment (RRE), a radio head (RH), a remote radio head (RRH), a radio unit (RU), or a remote radio unit (RRU).

The RE apparatus performs radio communication with a terminal that has established a radio link with the BDE apparatus, that is, wirelessly connected to the base station. The RE apparatus converts a radio signal received from the terminal into a baseband signal and sends the baseband signal to the BDE apparatus through the CPRI. On the other hand, the RE apparatus converts a baseband signal received from the BDE apparatus through the CPRI into a radio signal and transmits the radio signal to the terminal. The BDE apparatus performs demodulation and decoding for the baseband signal received from the RE apparatus to obtain digital data. Further, the BDE apparatus performs encoding and modulation for digital data to generate a baseband signal and send the baseband signal to the RE apparatus through the CPRI.

The BDE apparatus is provided with a first transmission line interface (also called a line interface) that is connected, through a transmission line (network), to another base station or a core network including core nodes such as, for example, a Mobility Management Entity (MME), a Serving Gateway (S-GW), or a Packet Data Network Gateway (P-GW). Further, the BDE apparatus is provided with a second transmission line interface that is connected to a radio apparatus (radio equipment) through a communication link (for example, CPRI) using a medium such as, for example, an optical cable.

The MME refers to a node that handles a control plane (C plane) and operates as a control unit of a base station. The MME performs a location registration for a terminal wirelessly connected to the base station. Further, the MME controls the setting of a path for the terminal wirelessly connected to the base station. The S-GW sets the path under the control of the MME. The P-GW refers to a gateway between the external network and the core network.

FIG. 1 illustrates an exemplary configuration of a BDE apparatus according to a first embodiment. In FIG. 1, the BDE apparatus 10 includes a chassis 12 (case) having a plurality of slots 11, cards 13 inserted (accommodated) into the respective slots 11, a plurality of fan units 14 installed in the case to be used for cooling the cards 13 accommodated in the respective slots 11, and a control unit 15.

As illustrated in FIG. 1, each slot 11 is used as an accommodation section of a card 13. The accommodation section is a concept including a "rack" or a "shelf". The fan units 14 are located at the positions to blow air to a predetermined number (four in FIG. 1) of slots 11, respectively. The number of revolutions of a fan provided in each fan unit 14 is controlled by the control unit 15. According to the present embodiment, the number of revolutions of the fan unit 14 is controlled in two stages of "high-speed revolution" and "low-speed revolution". The slot 11 is an example of an "accommodation section" or an "accommodating position". The number of revolutions of the fan unit 14 is an example of a "cooling level" that is controlled by the control unit 15. Each fan unit 14 may be configured as a single fan, or may be an assembly of a plurality of fans.

The card 13 is an apparatus having an exterior appearance of a plate shape, and a module for performing a desired function or process is mounted on the card. The module includes one of an electronic component, an electronic device, and a physical apparatus, or a combination of two or more of them. The card 13 is also called a "function card". The card 13 may also be called, for example, a "panel", a "board", a "package", or a "plug-in unit (PIU)". The card 13 is an example of a "module device". The module device may have an exterior appearance other than the card shape.

Each card 13 has a connector (not illustrated), and is connected with a connector (not illustrated) that is provided within each slot 11. Thus, the card 13 is fixedly accommodated in a slot 11. The cards 13 accommodated in the respective slots are communicably connected with each other through an input/output (I/O) interface (not illustrated) within the apparatus by the mutual connection of the connectors. The I/O interface within the apparatus is, for example, a Serial Rapid IO (SRIO). The cards 13 may be connected through an interface other than the SRIO, as long as the cards are communicably connected with each other.

In the present embodiment, the slots 11 are divided into groups each having a predetermined number of slots 11. In the example of FIG. 1, the predetermined number is four, and sixteen slots 11 are divided into four groups. Each fan unit 14 blows, for example, cooling air to the cards 13 accommodated in the slots 11 belonging to one of the groups. In this way, each fan unit 14 is associated with either one group of slots 11. Here, it is noted that mounting a plurality of cards in a mounting range of one cooling apparatus (for example, a fan unit) is effective to achieve the high density of the BDE apparatus since the width occupied by a card is narrow compared to the mounting width of a cooling apparatus that is mounted within the case of the BDE apparatus. According to the present embodiment, control of a fan unit is performed in units of groups to which the plurality of cards belong, which enables a plurality of cards to be mounted within the mounting range of one cooling apparatus, thereby achieving the high density of the BDE apparatus. An individual cooling apparatus may be mounted on each card, in addition to the cooling devices mounted in the case of the BDE apparatus. Each cooling device 14 may be an assembly of a plurality of sub-units (fans), and each sub-unit may have an independent case.

The number of the slots 11, the number of the groups, and the number of the fan units 14 may be prepared as desired without being limited to the above-described example. For example, one cooling device may be allocated to one slot 11 (card 13). Further, the cooling device (fan unit 14) to be controlled by the control unit 15 may be provided to one of the case and the card 13 or each of the case and the card 13.

The fan unit 14 is an example of a cooling device which is not limited to the fan unit 14. For example, a cooling device may be used that optionally employs various cooling methods such as, for example, an air-cooling method, a water-cooling method, and a gas-cooling method.

The control unit 15 is communicably connected with each fan unit 14 and each card 13. The control unit 15 includes at least a central processing unit (CPU) 16 and a memory 17. The memory 17 includes a non-volatile storage medium and a volatile storage medium. The non-volatile storage medium may be, for example, a read-only memory (ROM), a hard disk drive (HDD), a solid state drive (SSD), a flash memory, or an electrically erasable programmable read-only memory (EEPROM). The non-volatile storage medium stores therein a program executed by the CPU 16, and data to be used when the program is executed. The volatile storage medium may be, for example, a random access memory (RAM). The volatile storage medium is used as a work region of the CPU 16 and a region for storing data. As illustrated in FIG. 1, the memory 17 stores therein a management table 17A and a cooling table 17B.

The CPU 16 may perform various processing by loading the program stored in the non-volatile storage medium to the volatile storage medium and executing the program. For example, the CPU 16 executes the program to control the number of revolutions of each fan unit 14 on the basis of a temperature in the BDE apparatus. Further, the CPU 16 performs an expulsion in which a process executed in a card 13 is transferred to be executed in another card 13 of the same type, on the basis of a temperature in the BDE apparatus.

The control unit 15 may include a digital signal processor (DSP) in addition to the CPU 16. The processing performed by the control unit 15 may be performed by the CPU 16 and the DSP. The processing performed by the CPU 16 of the control unit 15 may be performed in one of a programmable logic device (PLD) such as a field programmable gate array (FPGA), and an integrated circuit (IC) including a large-scale integration (LSI) and an application specific integrated circuit (ASIC).

The cards 13 mounted on the BDE apparatus 10 are classified into a plurality of types on the basis of difference of modules mounted on the cards 13, functions performed by the cards 13, processing performed by the cards 13, or combinations thereof. For example, the cards 13 may be classified into an L1 card, an L2 card, a call control card, a BB signal processing card, and a transmission line card. For example, two or more cards 13 of the same type may be mounted depending on the number of lines accommodated by the BDE apparatus 10.

The L1 card is a card 13 that is responsible for processing (for example, processing related to layer 1 (physical layer) and layer 2 (Media Access Control (MAC) layer) of an Evolved-Universal Terrestrial Radio Access Network (E-UTRAN) protocol stack) related to a physical channel and a transport channel, and is provided with a module that performs the processing related to the physical channel and the transport channel. For example, the L1 card provides a logical layer that does not rely on a radio resource (for example, cell) with respect to a processing card (for example, the L2 card) that handles a higher-order layer than the L1 card in the radio communication layer.

The L2 card is a card 13 that is responsible for processing (for example, processing related to a Packet Data Convergence Protocol (PDCP) layer and a Radio Link Control (RLC) layer) related to the L2 (Layer 2) with respect to a logical channel or a higher layer. The L2 card is provided with a module that performs processing related to layer 2 (RLC and PDCP). For example, the L2 card provides a PDCP service such as, for example, header compression, to a processing card (for example, a call control card) that is in a higher-order layer than the L2 card in the radio communication layer.

The call control card is a card that is responsible for call control (for example, a Radio Resource Control (RRC)) such as, for example, line setting or line releasing. The call control card is provided with a module that is responsible for processing of, for example, an RRC layer of the E-UTRAN protocol stack. Further, a plurality of call control cards may be accommodated, and a main call control card also performs a load balancing control of allocating a mobile station to another call control card together with the processing such as, for example, the above-described call control.

The BB signal processing card performs scheduling of a signal path that is established for a mobile station by a plurality of cards that handle various processing of the radio communication layer and allocation of a radio resource (for example, a frequency block or a preamble code).

There are two types of transmission line cards, namely, a card 13 that functions as the above-described first transmission line interface and a card 13 that functions as the second transmission line interface. The transmission line card functioning as the first transmission line interface is responsible for communicating with a node (for example, MME or S-GW) on the core network or another base station. The transmission line card functioning as the second transmission line interface performs processing of transmitting a signal received from the L1 card to a radio apparatus RE through a communication link and providing a signal received from the radio apparatus RE to the L1 card. The card 13 may include a control card that controls the entire operation of the BDE apparatus.

Figure 2:
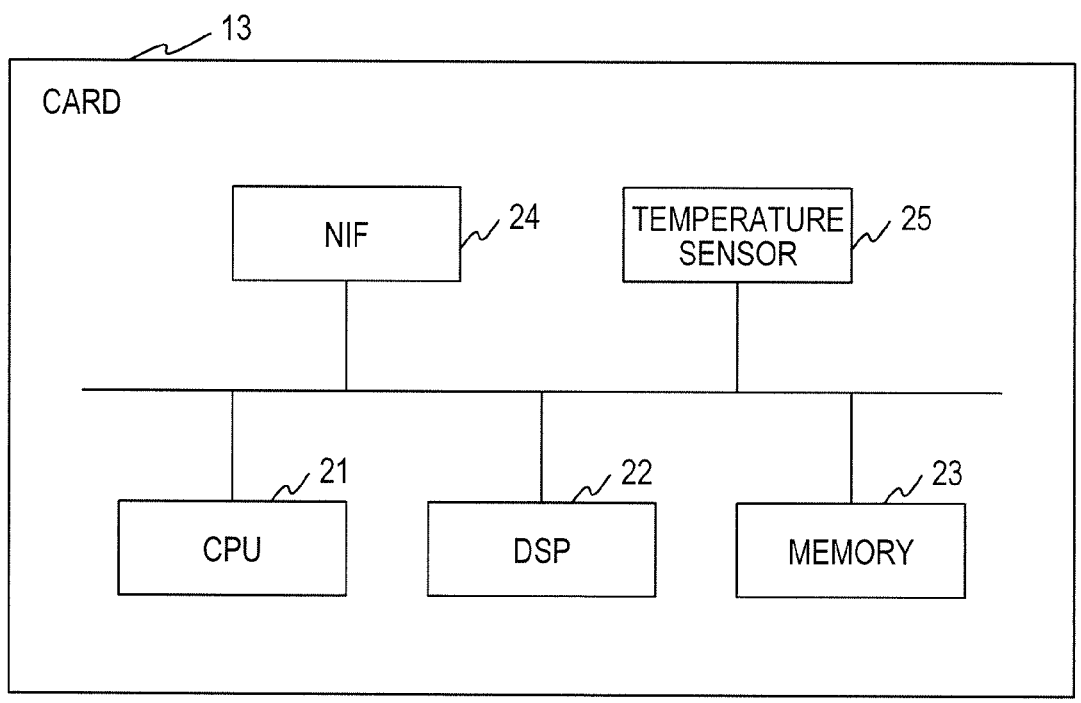
FIG. 2 illustrates an exemplary hardware configuration of a card.

FIG. 2 illustrates an exemplary hardware configuration of the card 13. In FIG. 2, the card 13 includes, as examples of the module, a CPU 21, a DSP 22, a memory 23, a network interface (NIF) 24, and a temperature sensor 25, which are connected to each other through a bus. The CPU 21, the DSP 22, the memory 23, and the NIF 24 are examples of the electronic device or the electronic circuit included in the card 13 (module device). The card 13 may include a power unit (power circuit) that is not illustrated in the drawing. The card 13 operating as the BB signal processing card performs a scheduling of a signal path established for a mobile station by a plurality of cards that handle various processing of a radio communication layer and an allocation of a radio resource (for example, a frequency block or a preamble code). Therefore, the processing load and a calorific value in the card 13 are high compared with other cards 13. Consequently, a cooling device such as, for example, a heat sink or a heat pump may be installed on the card itself. Such a cooling device as described above may be mounted on the other processing cards themselves.

The memory 23 may have an identical configuration as the memory 17. The memory 23 stores therein at least a temperature measurement value that is measured by the temperature sensor 25. Further, the memory 23 may store therein a temperature threshold corresponding to the card 13 which is mounted with the memory 23. Moreover, the memory 23 may store therein information (identifier of the card 13) indicating the type of the card 13.

The CPU 21 and the DSP 22 execute a program stored in the memory 23. The memory 23 stores therein a program according to the card type. By executing the program, the card 13 may operate as any one of the L1 card, the L2 card, the call control card, the BB signal processing card, and the transmission line card.

One of the CPU 21 and the DSP 22 or both of them of each card 13 execute the program to calculate information indicating a capacity (an unused computational resource (unused resource)) that may be used, and store the information in the memory 23. As the method of calculating the resource, any of the existing methods may be applied. The control unit 15 may regularly collect information of the unused resources from the respective cards 13. Alternatively, the control unit 15 may acquire information from the respective cards 13 through an inquiry to the cards 13. The information of the unused resource is an example of "information indicating the processing load of the module device".

The NIF 24 is a communication interface circuit communicating with another card 13 or the control unit 15. As for the NIF 24, for example, a local area network (LAN) card, a network interface card (NIC), an SRIO interface card, or a Peripheral Component Interconnect (PCI) Express interface card may be utilized.

The temperature sensor 25 measures the temperature affected by the heat generated by the mounted components. For example, the temperature sensor 25 measures the temperature around the card 13 or the temperature on a surface of the card 13. The measured result of the temperature is transmitted to the control unit 15 (fan-unit controller) through the NIF 24. Two or more temperature sensors 25 may be provided. When two or more temperature sensors 25 are provided on one card 13, the temperature is measured at a plurality of locations on the card 13, and any one of an average value of the measured values, a maximum value, and an aggregated value other than the average value may be transmitted to the control unit 15.

The control of the number of revolutions of the fan unit 14, the expulsion of a job, or both, which are performed by the CPU 16 of the control unit 15, may be performed by the CPU 21 of the card 13.

FIGS. 3A and 3B illustrate an exemplary data structure of the management table 17A. The management table 17A illustrated in FIGS. 3A and 3B includes a plurality of entries prepared for respective slot numbers. Each entry includes a slot number, a group identifier (ID), a card type, a temperature measurement value, a high temperature threshold, a low temperature threshold, and a temperature state flag.

The slot number is an identifier of each slot 11. The group ID is an identifier of a group to which each slot 11 belongs and is a concept corresponding to each fan unit 14 (cooling device) illustrated in FIG. 1. For example, the group ID "1" corresponds to the fan unit 14 (cooling device) "#1", the group ID "2" corresponds to the fan unit 14 (cooling device) "#2", the group ID "3" corresponds to the fan unit 14 (cooling device) "#3", and the group ID "4" corresponds to the fan unit 14 (cooling device) "#4". When an object to be controlled by the control unit 15 is a cooling device (fan unit 14) installed on each card 13, the slot number may be used as a concept corresponding to the cooling device 14.

The card type represents the types of card 13. For the purpose of simple description, FIGS. 3A and 3B illustrate an example in which the above-described card types are the L1 card, the L2 card, and the call control card (L3 card). In FIGS. 3A and 3B, the symbol "L1" indicates that the card 13 is the L1 card, and the symbol "L2-1" indicates that the card 13 is the L2 card. The symbol "L2-2" indicates that the card 13 is the BB signal processing card. The symbol "L3" indicates that the card 13 is the call control card.

The temperature measurement value represents the temperature measurement value measured by each card 13. The high temperature threshold is a temperature threshold that is used for determining whether the number of revolutions of the fan unit 14 is to be changed to the "high-speed revolution". The low temperature threshold is a temperature threshold that is used for determining whether the number of revolutions of the fan unit 14 is to be changed to the "low-speed revolution". Each of the high temperature threshold and the low temperature threshold may be common to all types of card 13, common to every group, common to every type of the card 13, or different in every card 13.

The temperature state flag is set to a value indicating "High" when the temperature is higher than the high temperature threshold, and is set to a value indicating "Low" when the temperature is lower than the low temperature threshold.

The slot number and the group ID are statically set in the management table 17A. The combination of the slot number and the group ID may be appropriately changed according to a relationship between the mounting position of the cooling device and the mounting position of the slot. The card type may be statically set in the management table 17A, or may be set in the management table 17A using the identifiers of the cards 13 acquired from the respective cards 13 by the control unit 15. For example, when the type and the number of the cards 13 belonging to a group and the arrangement of the cards 13 are determined in advance, the card type may be statically set in the management table 17A. Or, the control unit 15 may acquire the identifiers of the cards from the respective cards and dynamically set the type and the number of the cards in the management table 17A by acquiring the identifiers of the cards from the respective cards 13 by the control unit 15. Alternatively, the setting contents may be downloaded from, for example, a server apparatus through a network. In the example of FIGS. 3A and 3B, the configuration and arrangement of the cards 13 in each group are determined in advance, and one L1 card (L1), one L2 card (L2-1), one BB signal processing card (L2-2), and one call control card (L3) are arranged in the order of: L1→L2-1→L2-2→L3. When the arrangement of the cards 13 is dynamically changed, there may be adopted a configuration in which the control unit 15 acquires the identifiers of the cards stored in the cards 13 and registers the identifiers in the management table 17A.

The temperature measurement values are collected from the respective cards 13 by the control unit 15 and registered in the management table 17A. The method of collecting the temperature measurement values is not limited to a particular method. For example, the control unit 15 may collect the temperature measurement value by transmitting an inquiry to each card at an arbitrary timing and then receiving a response including the temperature measurement value transmitted from the card that has received the inquiry. Alternatively, each card may transmit the temperature measurement value to the control unit at an arbitrary timing, and the control unit may receive the temperature measurement values transmitted from the cards to collect the temperature measurement values. Furthermore, each card may store the temperature measurement value in a memory element that may be referred by the control unit, and the control unit may refer to the temperature measurement value stored in the memory element of each card to collect the temperature measurement values.

The high temperature threshold and the low temperature threshold may be statically set in advance in the management table 17A, or the control unit 15 may register a value stored in each card 13 into the management table 17A. For example, when the arrangement of the cards 13 relative to the slots 11 is determined in advance, each threshold may be statically set in the management table 17A. In contrast, when the arrangement of the cards 13 is dynamically changed, the control unit 15 may set the value acquired from each card 13 in the management table 17A.

In other words, the control unit 15 may acquire temperature information including the temperature measurement values from the cards 13. The control unit 15 may acquire temperature information, including the combination of the temperature measurement value and threshold, from the cards 13. In this case, even if the cards have the same card type, every card may set its inherent threshold in the management table 17A. The control unit 15 may acquire the card-type information (card identifier) along with the temperature information. In this case, the type of the cards 13 accommodated in each slot 11 becomes properly selectable.

FIG. 4 illustrates an exemplary data structure of the cooling table 17B. The cooling table 17B manages a cooling level indicating a control amount (in the present embodiment, a revolution amount of the fan unit 14) of the cooling device in association with the group ID of each group.

Figure 5:
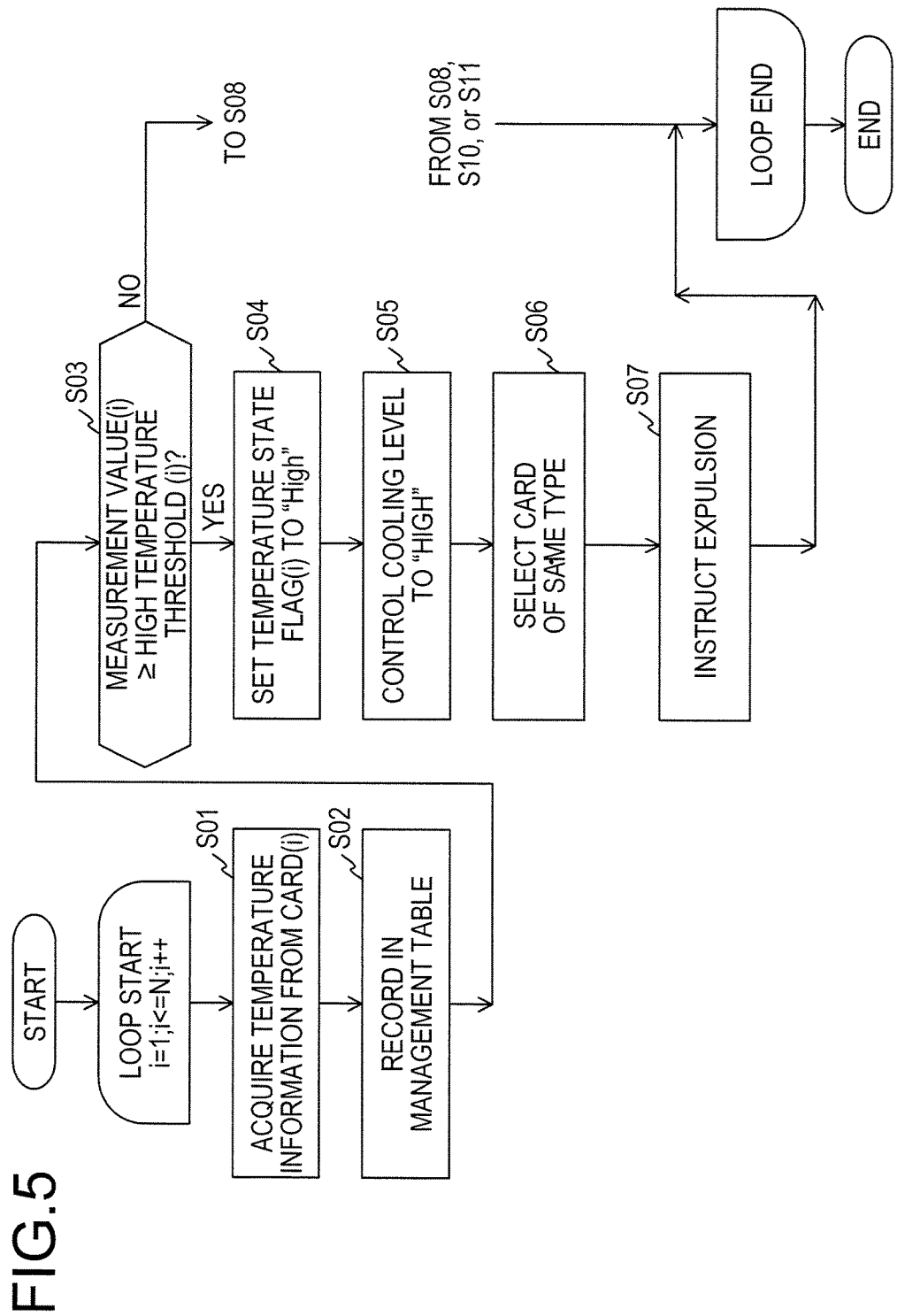
FIG. 5 is a flowchart illustrating exemplary processing of a control unit (CPU) according to a first embodiment.
Figure 6:
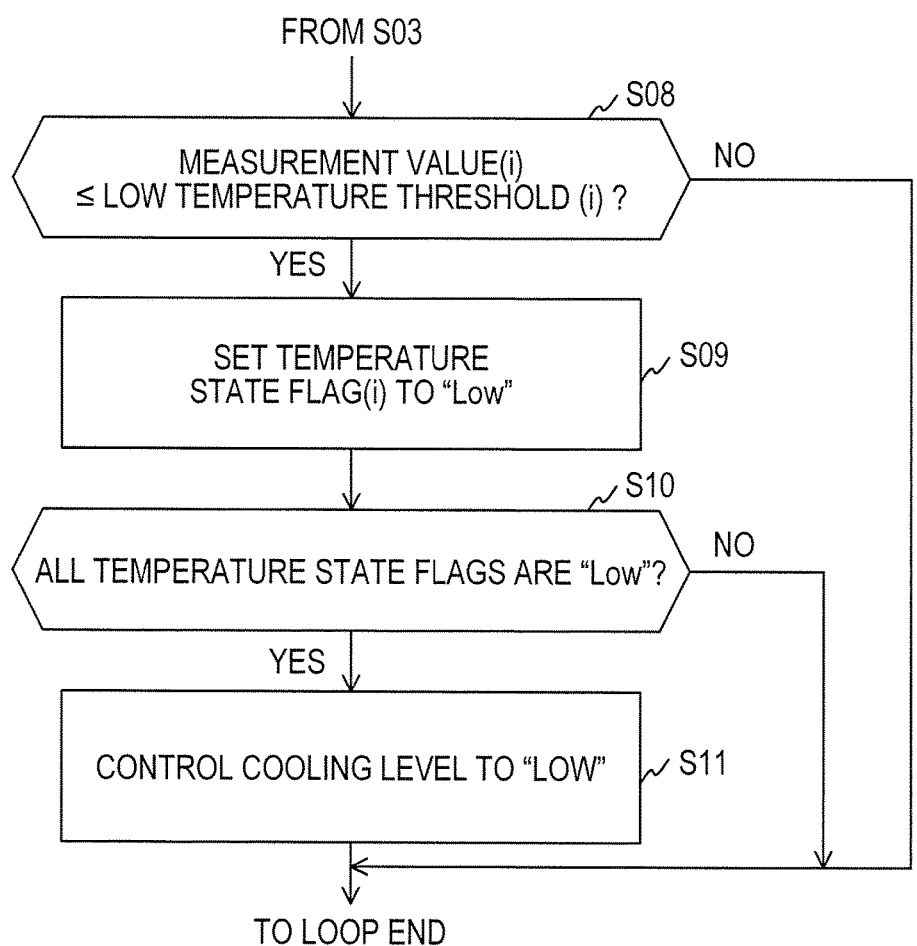
FIG. 6 is a flowchart illustrating exemplary processing of a control unit (CPU) according to a first embodiment.

FIGS. 5 and 6 are flowcharts illustrating exemplary processing of the control unit 15 (CPU 16). The processing illustrated in FIGS. 5 and 6 is executed, for example, in a predetermined cycle. However, the processing may be started at a timing other than the predetermined cycle, for example, when an operator of the BDE apparatus 10 inputs a command. As an example, it is assumed that the numbers of revolutions of all the fan units 14 are the "low-speed revolution" at the time when the processing of FIGS. 5 and 6 starts. In this case, the cooling level of each group in the cooling table 17B is set to "low".

When the processing is started, a value of variable "i" (i is a positive integer: in this embodiment, 1 to 16) indicating a slot 11 (card 13) is set to 1. When the value of variable "i" is equal to or less than N (N is a positive integer and represents the number of slots (=16)), the loop processing starting with S01 is repeated. Whenever the loop processing is terminated once after S01, 1 is added to the value of the variable "i".

In S01, the CPU 16 communicates with a card accommodated in the i-$_{th}$ slot (indicated as "card (i)") and receives temperature information. The temperature information includes a temperature measurement value, and may include thresholds (a high temperature threshold and a low temperature threshold) as other information elements. In the case where no threshold is included in the temperature information, the CPU 16 may use a predetermined threshold that has been previously registered in the management table 17A or that is to be uniformly applied. In this case, the CPU 16 acquires the temperature information including the temperature measurement value of the card (i).

In S02, the CPU 16 registers the temperature information (temperature information (i)) of the card (i) in a corresponding entry of the management table 17A. In S03, the CPU 16 refers to an entry of the management table 17A corresponding to the card (i), and determines whether the temperature measurement value (i) included in the temperature information (i) is equal to or more than the high temperature threshold (i) (whether the temperature measurement value (i) reaches a predetermined range). When it is determined that the temperature measurement value (i) is less than the high temperature threshold (i) ("No" at S03), the processing proceeds to S08 of FIG. 6. When the temperature measurement value (i) is equal to or more than the high temperature threshold (i) ("Yes" at S03), the processing proceeds to S04. In S03, it may be determined whether the value exceeds the high temperature threshold.

In S04, the CPU 16 sets the value of the temperature state flag (i) of the entry of the card (i) to "High". In S05, the CPU 16 identifies a group to which the card (i) belongs on the basis of the entry of the card (i) (the group is identified by referring to the group ID), and performs a control such that the cooling level of the fan unit 14 for cooling the cards 13 belonging to the group to "High". For example, in the case of the group ID "1", the CPU 16 sends a control signal to change the number of revolutions to the "high-speed revolution", to the fan unit 14 "#1" corresponding to the group ID "1", and the fan unit 14 "#1" increases the number of revolutions. Further, the CPU 16 sets the corresponding cooling level to "High" in the cooling table 17B.

As described above, each group ID is an identifier of a group to which each slot 11 belongs, and is a concept corresponding to each cooling device 14 illustrated in FIG. 1. When an object to be controlled by the control unit 15 is the cooling device (fan unit 14) installed on each card 13, the slot number may be used as the concept corresponding to the cooling device 14. For example, when the value of the temperature state flag (i) of the card (i) is set to "High", the CPU 16 may send a control signal to change the number of revolutions to the "high-speed revolution", to the cooling device 14 corresponding to the slot number "i". In this case, the slot number "i" and the cooling device 14 may in one-to-one correspondence with each other. The fan unit 14 (cooling device) may be an assembly of a plurality of sub-units (fans), and each sub-unit may have an independent case.

In S06, the CPU 16 selects a predetermined card (referred to as "card X") from cards 13 which belong to another group and are of the same type as the card (i), on the basis of a temperature, an unused resource amount (allocatable processing amount), or both. For example, a card 13, for which the temperature measurement value is not high (for example, the temperature measurement value is the lowest value), may be selected, among cards 13 of the same type, as a target (card X) for load balancing. Alternatively, a card 13 having a margin in the resource amount (for example, a card 13 having the largest resource amount) may be selected, among cards 13 of the same type, as a target (card X) for load balancing. This is because, by distributing the processing amount of the card (i) having the high temperature measurement value to the card X, the processing amount of the card (i) is reduced and the calorific value of the card (i) is suppressed. In the case where a card 13 of the same type belongs to the group to which the card (i) belongs, the relevant card 13 of the same type may be selected as the card X. In the example of FIGS. 3A and 3B, when the card (i) is an L1 card or a call control card, an L1 card or a call control card belonging to another group is selected as the card X. When the card (i) is an L2 card, an L2 card belonging to another group is selected. However, an L2 card belonging to the same group may be selected as well.

Another group to be selected may be dynamically determined on the basis of the temperature, the unused resource, or both of them, or may be determined in advance. An order of selecting the groups (order of priority) may be determined in advance. For example, when the cards 13 having the same temperature coexist, a card is selected as the card X in accordance with the priority.

In S07, the CPU 16 calculates a processing amount (an expulsion amount: assume to be a processing amount A) that may be allocated to the card X from the card (i), and instructs the card (i) to execute expulsion of processing corresponding to the processing amount A. The processing corresponding to the processing amount A is an example of a "part of processing". The processing amount A may be calculated on the basis of the unused resource amount that is collected in advance from the respective cards 13, or may be calculated on the basis of the unused resource amount that is obtained by inquiring of the cards 13 of the same type (including the card X). The expulsion may be performed by individually providing an instruction (control signal) to each of the card (i) and the card X from the CPU 16, or may be performed between the card (i) and the card X such that the card (i) conducts communication (negotiation) with the card X in response to an instruction received from the CPU 16. When S07 is completed, the value of variable "i" is incremented and the processing for the next card (i) is started.

In FIG. 5, the processing order from S04 to S07 is merely an example, and the present disclosure is not limited thereto. For example, the load balancing may be executed in S06 and S07, prior to executing the control of the cooling device in S05.

In S08, the CPU 16 determines whether the temperature measurement value (i) included in the temperature information (i) is equal to or less than the low temperature threshold (i) (whether the temperature measurement value (i) is reduced to a predetermined range). When it is determined that the temperature measurement value (i) exceeds the low temperature threshold (i) ("No" at S08), the processing for the current card (i) is terminated, and the processing for the next card (i) is started. When it is determined that the temperature measurement value (i) is equal to or less than the low temperature threshold (i) ("Yes" at S08), the processing proceeds to S09. In S08, it may be determined whether the temperature measurement value is less than the threshold.

In S09, the CPU 16 sets the value of the temperature state flag (i) of the entry of the card (i) to "Low". In S10, the CPU 16 determines whether all the temperature state flags of the group to which the card (i) belongs are "Low" or not. When at least one of the temperature state flags is not "Low" ("No" at S10), the processing for the current card (i) is terminated, and the processing for the next card (i) is started. When all the temperature state flags are "Low" ("Yes" at S10), the processing proceeds to S11. Further, when an object to be controlled by the control unit 15 is the cooling device (fan unit 14) installed on each card 13, the slot number may be used as the concept corresponding to the cooling device 14, and S10 may be omitted.

In S11, the CPU 16 sets the cooling level of the group to which the card (i) belongs to "Low". That is, the CPU 16 sends a control signal to change the number of revolutions to the "low-speed revolution", to the corresponding fan unit 14, and the fan unit 14 reduces the number of revolutions. Further, the CPU 16 sets the corresponding cooling level to "Low" in the cooling table 17B. When an object to be controlled by the control unit 15 is the cooling device (fan unit 14) installed on each card 13, a control signal may be transmitted to the cooling device 14 (fan unit) corresponding to the slot number "i" of the card (i) to reduce the cooling level (the number of revolutions).

Figure 7:
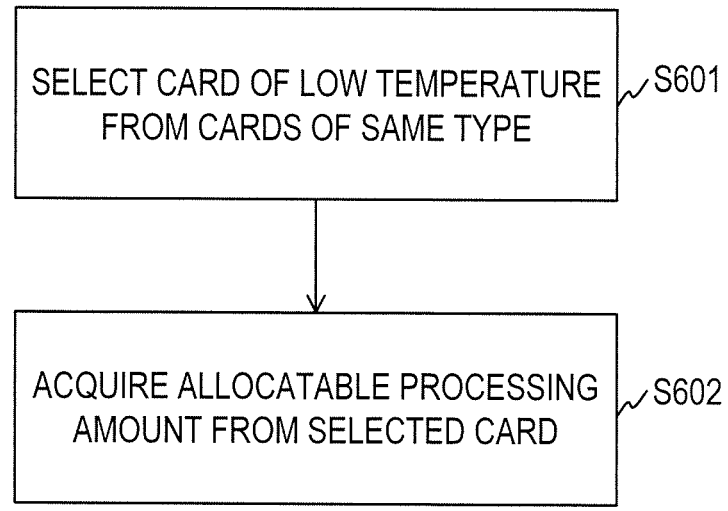
FIG. 7 illustrates exemplary processing of S06 (selection of a card X) illustrated in FIG. 5.
Figure 8:
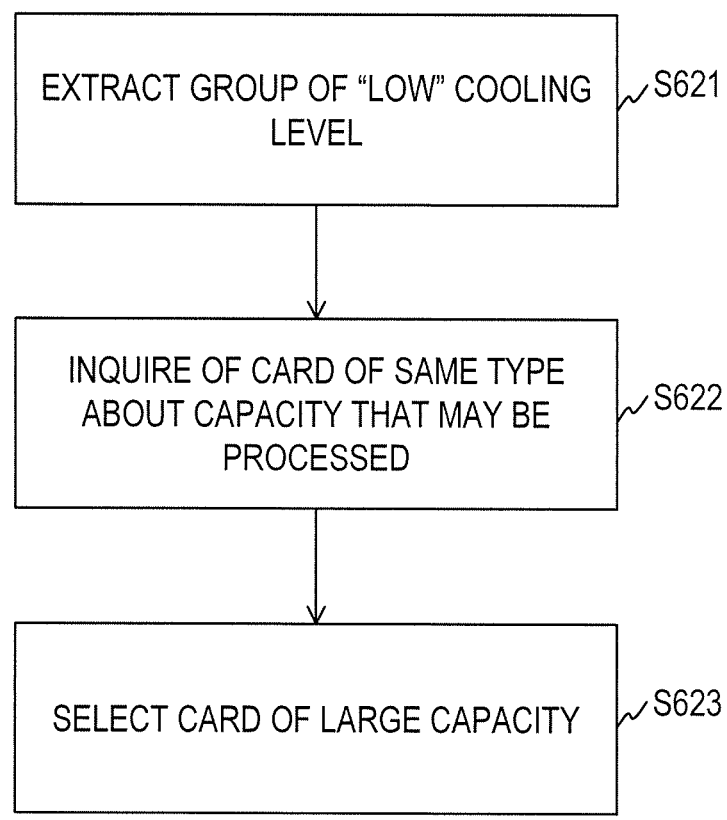
FIG. 8 illustrates exemplary processing of S06 (selection of a card X) illustrated in FIG. 5.
Figure 9:
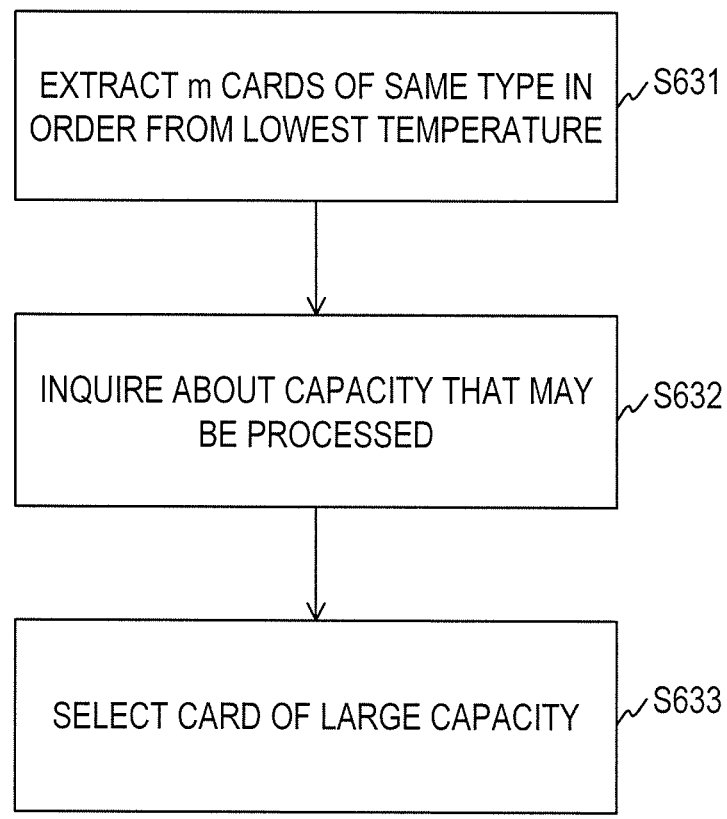
FIG. 9 illustrates exemplary processing of S06 (selection of a card X) illustrated in FIG. 5.

FIGS. 7 to 9 illustrate variations of S06 illustrated in FIG. 5. FIG. 7 illustrates an example in which only the temperature is considered among the temperature and the unused resource amount. In S601, the CPU 16 refers to the management table 17A, and selects a card 13, which has the lowest temperature measurement value among the cards 13 of the same type which belong to another group, as the card X. There may be a case where a card 13, which has the temperature measurement value higher than the lowest temperature measurement value, is selected. In S602, the CPU 16 makes an inquiry to the card X to acquire information indicating a processing amount A that is allocatable to the card X. Thereafter, the processing proceeds to S07.

FIG. 8 illustrates a first example in which both the temperature and the unused resource amount are considered. In S621, the CPU 16 refers to the cooling table 17B, and extracts a group with the cooling level of "Low". In S622, the CPU 16 inquires of each of cards 13 of the same type as the card (i) in the extracted group about a capacity (unused resource amount) that may be processed. In S623, the CPU 16 selects a card 13, which has a large unused resource amount (large unused resource size), as the card X. For example, a card 13, which has the largest unused resource size, is selected. However, a card 13, which has an unused resource size that is smaller than the largest unused resource size, may be selected as well in some cases.

FIG. 9 illustrates a second example in which both the temperature and the unused resource amount are considered. In S631, the CPU 16 extracts m cards 13 (m is a predetermined integer) in order from the lowest temperature, among cards 13 of the same type, as the card (i). In S632, the CPU 16 makes inquiry of each extracted card 13 about a capacity (unused resource amount) that may be processed. In S633, the CPU 16 selects a card 13, which has a large unused resource amount (unused resource size), as the card X. For example, a card 13, which has the largest unused resource size, is selected. However, a card 13, which has an unused resource size smaller than the largest unused resource size, may be selected as well in some cases.

As described above, in the case where only the temperature is considered among the temperature and the unused resource amount, it is considered that the processing amount is small in the card X and the unused resource amount is large. Thus, it is considered that processing corresponding to the processing amount A suppressing the calorific value of the card (i) is expelled to the card X. In the cases where both the temperature and the unused resource amount are considered, processing may be expelled from the card (i) as much as possible within a range where the calorific value of the card X does not exceed the high temperature threshold.

According to the first embodiment, when the temperature of the card (i) reaches a range that is equal to or more than the high temperature threshold, the CPU 16 changes the number of revolutions (cooling level) of the fan unit 14 to be increased (a high revolution), and expels processing performed in the relevant card 13 to another card X of the same type as the relevant card. This enables the processing amount of the relevant card (i) to be reduced and the calorific value of the relevant card (i) to be lowered. That is, the temperature of the card (i) may be suppressed from rising to a predetermined range (a range in which a normal operation is considered impossible). A card X, which has a low temperature, is selected as an expulsion destination. For this reason, the temperature of the card X may be suppressed from rising to the predetermined range as well. Here, when the card X may take the processing of the card (i) in the range where the temperature of the card X does not exceed the high temperature threshold, the number of revolutions of the fan unit 14 may be maintained in the low-speed revolution. Therefore, only the fan unit 14 corresponding to the card (i) is operated in the high-speed revolution and the fan unit 14 corresponding to the card X is suppressed from being operated in the high-speed revolution. Accordingly, the entire power consumption of the fan unit 14 may be reduced, and the power saving of the BDE apparatus 10 is enabled.

In a case where the temperature of the card X as the expulsion destination reaches or exceeds the high temperature threshold after the processing is expelled from the card (i) to the card X, the cooling level for the card X is increased in the same manner as the processing for the card (i), and the expulsion to another card is performed. As a result, since the temperature increase of the card X may also be suppressed while suppressing the temperature of the card (i) from rising up to a predetermined range, the reduction of the power consumption and noise of the entire apparatus may be achieved.

In the cooling table 17B of FIG. 4, the temperature measurement value of the card (i) belonging to the group 1 is equal to or more than the high temperature threshold, and the cooling level of the group 1 is changed to "High". However, since the temperature of the card X is less than the high temperature threshold although the expulsion to the card X belonging to the group 3 has been performed, it is illustrated that the cooling level of the group 3 is maintained to be "Low".

The management table 17A of FIGS. 3A and 3B illustrates an example in which cards 13 of the same type are mounted so as to belong to different groups. As a result, in the expulsion, a card 13 as an expulsion destination belongs to another group. For this reason, processing may be expelled to another group to which a fan unit 14 operating at the low cooling level belongs. For this reason, the calorific value of the card 13 belonging to the group of a fan unit 14 operating at the high cooling level may be suppressed from considerably increasing.

The above-described first embodiment may be modified as follows. FIGS. 10A and 10B illustrate the contents registered in the management table 17A according to a modified embodiment. FIG. 11 illustrates the registered contents (control result) of the cooling table 17B according to the modified embodiment. In the example of FIGS. 10A and 10B, cards 13 of the same type are mounted so as to be concentrated on the same group. Thus, in the expulsion in the modified embodiment, a card as the expulsion destination becomes a card 13 belonging to the same group. As a result, a load balancing is performed within the group where the cooling level is high. Therefore, as illustrated in FIG. 11, among the plurality of groups, the cooling level becomes high only in the group (group 2 in the example of FIG. 11) to which the card (i) belongs.

Therefore, since there is no expulsion from the group where the cooling level is high to another group, it is possible to avoid the increase in the calorific value of a card X having the low cooling level. In other words, in the expulsion in the modified embodiment, it is possible to suppress the calorific value of a card from being considerably increased while avoiding the cooling level of the entire BDE apparatus 10 (electronic apparatus) from becoming the high level only to cool some types of cards.

In order to make cards 13 of the same type (for example, BB signal processing cards) correspond to the same group, the slots 11 (specific slots) that allow accommodation of the cards 13 of the relevant same type may be limited. For example, the shape of the specific slots or the shape of the connectors connected with the cards 13 of the relevant same type in the specific slots may be made to be different from those in the other slots 11 so as to limit the slot 11. allowing the card 13 of the relevant same type to be accommodated therein. In other words, for example, by making the cards 13 of the relevant same type have a shape of, for example, a connector configured to be fitted into only the specific slots 11 according to the type, the slots 11 of the accommodation destination of the cards 13 of the relevant same type are enabled to be limited to the specific slots 11 according to the type of the cards 13 of the relevant same type.

Second Embodiment

Figure 12:
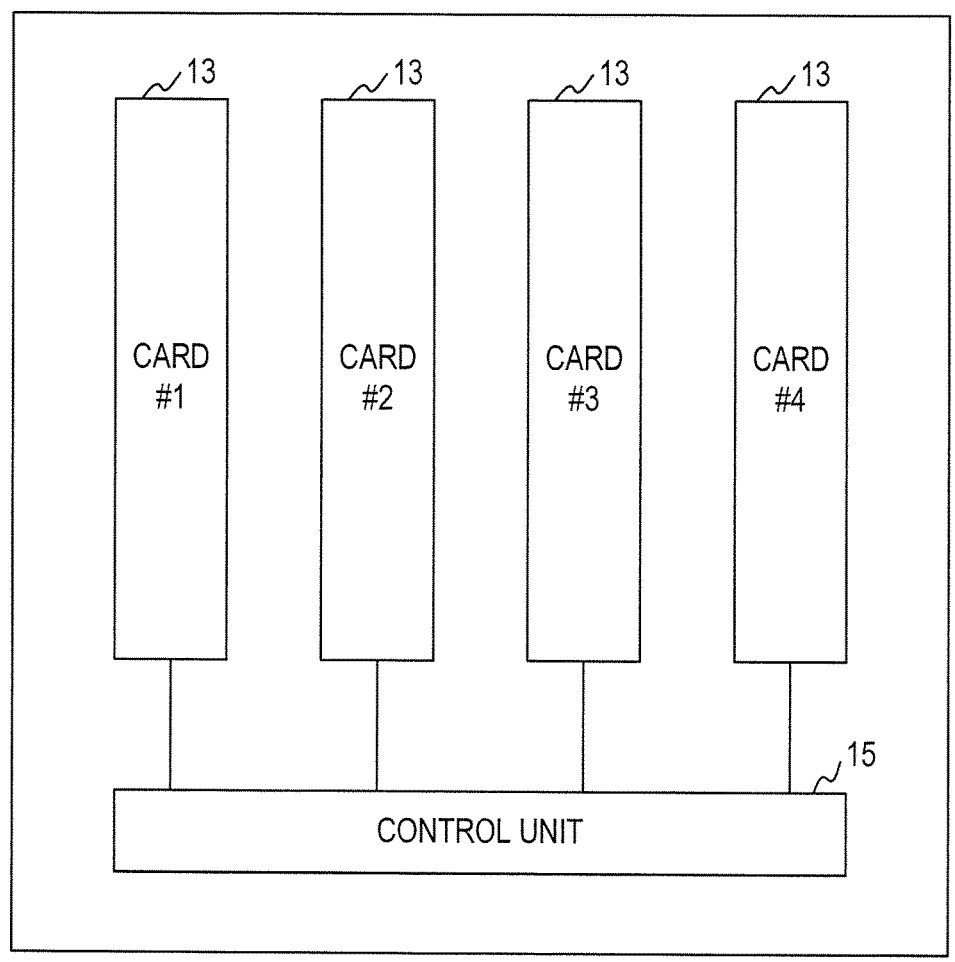
FIG. 12 illustrates an exemplary configuration of a group of cards according to a second embodiment.

A second embodiment will be described below. Since the second embodiment include points in common with the first embodiment, different points will be mainly described and descriptions for the common points will be omitted herein. FIG. 12 illustrates an exemplary configuration of a group of cards according to the second embodiment. FIG. 12 illustrates one of the groups described in the first embodiment. In FIG. 12, a plurality of cards 13 (cards #1 to #4) belonging to a group corresponding to a certain fan unit 14, and the control unit 15 connected to the respective cards 13 are illustrated. The slots 11 and the fan unit 14 are not illustrated in the drawing.

FIG. 13 is a flowchart illustrating an exemplary processing of the control unit 15 (CPU 16) according to the second embodiment. In S101, the CPU 16 determines whether the temperature measurement value of one of the cards #1 to #4 is equal to or more than the high temperature threshold. When it is determined that the temperature measurement value is less than the high temperature threshold for all the cards #1 to #4 ("No" at S101), the processing returns to S101. When it is determined that the temperature measurement value of one of the cards #1 to #4 is equal to or more than the high temperature threshold ("Yes" at S101), the CPU 16 increases the cooling level (number of revolutions) of the corresponding fan unit 14, and collects the temperature measurement values and the unused resource amounts from the cards #1 to #4 (S102).

In 103, the CPU 16 selects a card 13 (hereinafter referred to as a "high temperature card") whose temperature is equal to or higher than a predetermined high temperature threshold or is the highest among the collected temperature measurement values, and a card 13 (hereinafter, referred to as a "low temperature card") whose temperature is lower than a predetermined low temperature threshold or is the lowest. In S104, the CPU 16 calculates a processing amount A that may be allocated to the low temperature card. In S105, the CPU 16 expels processing corresponding to the processing amount A from the high temperature card to the low temperature card. There is a case in which the one card 13 and the high temperature card are the same card, there is also a case in which the one card 13 and the high temperature card are different cards of the same type. The high temperature card is an example of a "first card", and the low temperature card is an example of a "second card".

According to the second embodiment, processing is expelled from a high temperature card to a low temperature card within a group. In the high temperature card, the temperature is suppressed from reaching a predetermined range by the reduction of the processing amount. In the low temperature card, even if the calorific value increases due to the increase in processing amount, the temperature is suppressed from reaching the predetermined range. In this way, the temperature of the card 13 (a module device) may also be suppressed from reaching the predetermined range in the second embodiment. In the second embodiment, processing of a card 13, which has a temperature higher than the high temperature threshold, may be expelled, instead of the high temperature card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present disclosure have been described in detail, it should be understood that the various changes, substitutions, and alterations could be made hereto without departing from the spirit and scope of the invention.

What is claimed is:

1. An electronic apparatus, comprising:
    a chassis;
    a plurality of slots each configured to accommodate an electronic circuit board;
    a cooling system including a plurality of cooling devices each configured to cool an electronic circuit board accommodated in a selected slot; and
    a controller including a processor coupled with a memory and configured to control an overall operation of a plurality of electronic circuit boards each accommodated in each of the plurality of slots and the cooling system, wherein the processor of the controller is configured to:
        acquire respective temperatures of the plurality of electronic circuit boards which have been measured at each of the plurality of electronic circuit boards using a temperature sensor;
        increase a cooling level of a first cooling device of the plurality of cooling devices assigned to cool a first electronic circuit board of the plurality of electronic circuit boards when a temperature of the first electronic circuit board exceeds a first threshold value determined in advance; and
        expel, on basis of the respective temperatures, part of processing performed by the first electronic circuit board to a second electronic circuit board of the plurality of electronic circuit boards, the second electronic circuit board being of a same type as the first electronic circuit board,
    wherein an amount of the part of processing to be expelled to the second electronic circuit board is calculated based on an unused resource amount of the second electronic circuit board, and
    the processor of the controller is further configured to:
        select the second electronic circuit board from a first group of electronic circuit boards to which a second cooling device among the plurality of cooling devices is assigned and which respectively have a temperature not exceeding a second threshold value less than the first threshold value; and
        maintain a cooling level of the second cooling device at a low level as compared to the increased cooling level of the first cooling device after the part of processing performed by the first electronic circuit board is expelled to the second electronic circuit board.

2. The electronic apparatus according to claim 1, wherein the processor is further configured to select, as the second electronic circuit board, an electronic circuit board having a lower temperature among two or more electronic circuit boards of the same type.

3. The electronic apparatus according to claim 1, wherein the processor is further configured to select, as the second electronic circuit board, an electronic circuit board cooled by a second cooling device of the plurality of cooling devices different from the first cooling device.

4. The electronic apparatus according to claim 1, wherein the plurality of electronic circuit boards are divided into groups cooled by respective cooling devices, and the processor is configured to select the second electronic circuit board from a group in which the first electronic circuit board is included.

5. The electronic apparatus according to claim 4, wherein the processor is further configured to decrease a cooling level of a cooling device that cools electronic circuit boards included in a first group of the groups when temperatures of all electronic circuit boards included in the first group are lowered to a second threshold value lower than the first threshold value.

6. The electronic apparatus according to claim 1, wherein the processor is further configured to select the second electronic circuit board on basis of the respective temperatures and information indicating respective loads of electronic circuit boards of the same type.

7. An electronic apparatus, comprising:
    a chassis;
    a plurality of slots each configured to accommodate an electronic circuit board;
    a cooling system configured to commonly cool a plurality of electronic circuit boards accommodated in each of the plurality of slots; and
    a controller including a processor coupled with a memory and configured to control an overall operation of the plurality of electronic circuit boards and the cooling system, wherein the processor of the controller is configured to:
        acquire respective temperatures of the plurality of electronic circuit boards which have been measured at each of the plurality of electronic circuit boards using a temperature sensor;
        select a first electronic circuit board and a second electronic circuit board from among the plurality of electronic circuit boards when a temperature of a third electronic circuit board of the plurality of electronic circuit boards reaches a predetermined temperature range, the first electronic circuit board and the second electronic circuit board being a same type as the third electronic circuit board, the first electronic circuit board having a highest temperature among electronic circuit boards of the same type as the third electronic circuit board or a temperature higher than a first threshold value determined in advance, the second electronic circuit board having a lowest temperature among electronic circuit boards having the same type as the third electronic circuit board or a temperature lower than a second threshold value determined in advance which is lower than the first threshold value; and expel part of processing performed by the first electronic circuit board to the second electronic circuit board, wherein an amount of the part of processing to be expelled to the second electronic circuit board is calculated based on an unused resource amount of the second electronic circuit board, and the processor of the controller is further configured to:

select the second electronic circuit board from a first group of electronic circuit boards to which a second cooling device among a plurality of cooling devices included at the cooling system is assigned and which respectively have a temperature not exceeding a second threshold value less than the first threshold value; and maintain a cooling level of the second cooling device at a low level as compared to the increased cooling level of the first cooling device after the part of processing performed by the first electronic circuit board is expelled to the second electronic circuit board.

8. A method of operating an electronic apparatus including a chassis, a plurality of slots each configured to accommodate an electronic circuit board, a cooling system including a plurality of cooling devices, and a controller including a processor coupled with a memory, the method comprising:

acquiring respective temperatures of a plurality of electronic circuit boards accommodated in each of a plurality of slots of the electronic apparatus;

increasing a cooling level of a first cooling device of the plurality of cooling devices assigned to cool a first electronic circuit board of the plurality of electronic circuit boards when a temperature of the first electronic circuit board exceeds a first threshold value determined in advance;

selecting a second electronic circuit board from a first group of electronic circuit boards to which a second cooling device among the plurality of cooling devices is assigned and which respectively have a temperature not exceeding a second threshold value less than the first threshold value;

expelling, on basis of the respective temperatures, part of processing performed by the first electronic circuit board to the second electronic circuit board, the second circuit board being of a same type as the first electronic circuit board; and after the expelling, maintaining a cooling level of the second cooling device at the low level as compared to the increased cooling level of the first cooling device, wherein an amount of the part of processing to be expelled to the second electronic circuit board is calculated based on an unused resource amount of the second electronic circuit board.

* * * * *